United States Patent Office

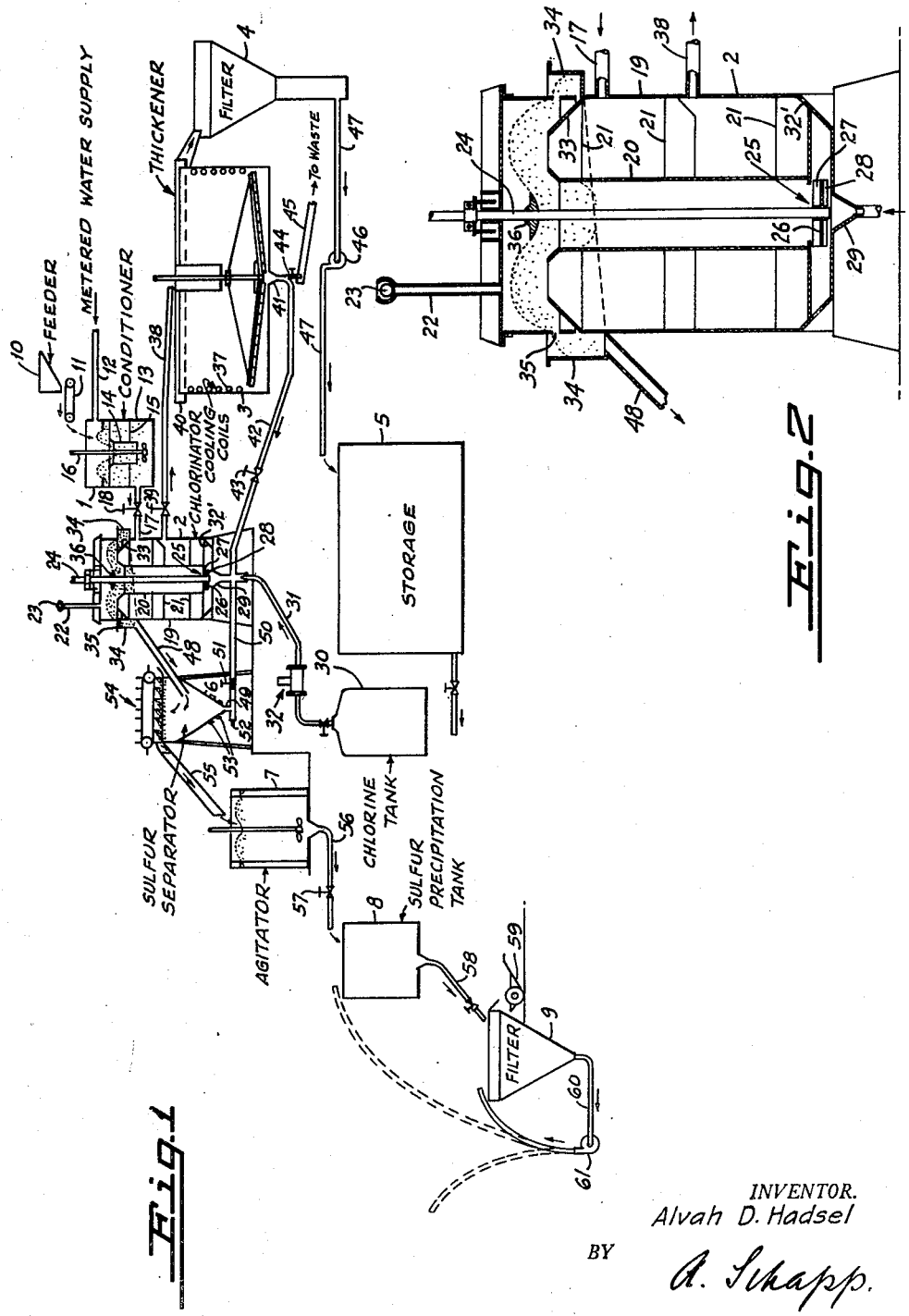

2,697,034
Patented Dec. 14, 1954

2,697,034

CHLORINATION PROCESS FOR TREATING ORES

Alvah D. Hadsel, Auburn, Calif.

Application May 15, 1950, Serial No. 162,081

4 Claims. (Cl. 75—112)

The present invention relates to improvements in a chlorination process for treating ores, and has particular reference to the treatment of concentrates of complex sulfide ores, although various principles of the invention may be used in the treatment of other ore concentrates or of pulverized ores which do not need concentration.

Ores of the character under consideration may be crushed and comminuted in a conventional manner and subjected to a flotation process to separate the metal bearing concentrates from waste material. Other ores, again, such as limestone, magnesite and serpentine may be merely pulverized in preparation for my process.

While these operations usually take place at the mine, it has been customary to ship the concentrates to the smelter for further treatment which involves considerable expense and usually makes the operation of so-called marginal mines unprofitable except at times where unusually high prices prevail. Furthermore, in smelting processes commonly employed the sulfur present in the sulfides is usually a waste product which further reduces the value of the concentrates.

In the present invention it is proposed to provide a chlorination process for the treatment of the concentrates which can be carried out by the use of comparatively simple and inexpensive apparatus so as to be adapted for installation at the mine and to eliminate the shipping of the concentrates to distant smelters.

It is further proposed to provide a chlorination process in which the sulfur present in the concentrates is made to rise to the surface of the body under treatment and is recovered as an independent marketable product.

It is further proposed to provide a chlorination process in which all the sulfides present are turned into chlorides and in which the final product is a clear liquid holding the metal chlorides in solution, and from which the metals may be recovered by a relatively simple process of progressive precipitation which may also be readily carried out at the mine.

A typical sample of concentrates, in the treatment of which my process was developed, may contain approximately the following ingredients in the proportions set forth:

| | | |
|---|---|---|
| Gold (Au) | value $2.50 to $4.00 | per ton |
| Silver (Ag) | 8 to 13 oz. | per ton |
| Copper (Cu) | 6.00% or 120 lbs. | per ton |
| Lead (Pb) | 3.00% or 60 lbs. | per ton |
| Zinc (Zn) | 46.50% or 930 lbs. | per ton |
| Iron (Fe) | 8.00% or 160 lbs. | per ton |
| Sulfur (S) | 30.00% or 600 lbs. | per ton |
| Insolubles | 6.50% or 1?0 lbs. | per ton |
| Total | 100.00% or 2000 lbs. | |

One of the outstanding features of my chlorination process is temperature control. I have found that for my purposes the chlorination process should be carried out at relatively low temperatures, preferably within the range of from 15° C. to 60° C., and that even within this range the lower temperatures are most effective.

Now, it is well known that the reactions in a chlorination process create heat sufficient to normally raise the temperature of a body under treatment considerably above the range of temperatures indicated and also greatly above the melting point of sulfur and even above the melting points of some of the metals present, which again leads to various reactions unfavorable to the process.

I propose, therefore, to conduct the chlorination process in the presence of a cooling medium, and more particularly in the presence of an ample body of water, which keeps the temperature down at least to 100° C., and in view of the fact that this is the principal feature of my process, I refer to the latter as a submerged chlorination process.

In order to effect a thorough mixing of the concentrates and the water, I preferably pre-mix these constituents in a special pre-mixer or conditioner under conditions which allow the feed of concentrates and water to be closely adjusted.

It is further proposed in the present invention to further enhance the cooling effect by continuously by-passing a portion of the material under treatment through a thickener containing a large body of water and preferably equipped with cooling coils, the thickener at the same time serving to separate pregnant solution from solids, to discharge the solution as the finished product of the chlorination process, and to return the solids carried by a cool stream of water to the chlorination tank.

My process is preferably carried on as a continuous process with a continuous feed of pre-mixed, water-carried concentrates, a continuous by-passing through the thickener, and continuous discharge of pregnant solution.

Since the process is carried out at a low temperature the sulfur liberated in the chlorination process rises to the top of the mass under treatment in the form of a froth which flows over into a launder and is subjected to further treatment for separating pure sulfur from remaining sulfides and to return the latter into the chlorination process, this separating process being preferably conducted batch-wise.

Further objects and advantages of my invention will appear as the specification proceeds, and the novel features of my invention will be fully defined in the claims attached hereto.

The preferred form of my invention is illustrated in the accompanying drawing, in which Figure 1 shows a flow sheet diagrammatically illustrating the various steps and apparatus adapted for carrying out the invention, and Figure 2, a vertical section through a chlorinator used in my process.

While I have shown only the preferred form of my invention, I wish to have it understood that various changes and modifications may be made within the scope of the claims attached hereto without departing from the spirit of the invention.

Referring to the drawing in detail, the apparatus required for carrying out my process comprise in their principal features a mixing tank or conditioner 1, a chlorinating tank or emulsifier 2, a thickener 3, a filter 4, a pregnant solution storage tank 5, a sulfur separator 6, a solvent agitator 7, a sulfur precipitation tank 8, and a sulfur filter 9.

In the first step of the process the concentrates, if dry, are fed from a hopper 10 over a conveyor 11 and into the conditioner 1. At the same time water is fed into the conditioner through the pipe 12, the water being metered and being supplied in sufficient amount to provide an easy flowing pulp in the conditioner comprising about 10% solids and 90% liquid. If the concentrates are already in pulp form, as they might be, coming directly from the thickener of a flotation plant, they might be fed by means of a diaphragm pump. At any rate, the material fed should be under control as to quantity, by weight.

The conditioner is substantially conventional in form and comprises a preferably cylindrical tank 13, a cylindrical guide 14 mounted concentrically within the tank, one or more pairs of vertical blades 15 connecting the tank and the guide to minimize centrifugal action, and a central shaft 16 having impeller blades at its lower end to set up circulation down through the guide and up outside the guide. The principal function of this conditioner is to thoroughly mix the metered water and the weighed concentrates, to maintain a uniform pulp density and to hold the solids in suspension until the pulp is delivered to the chlorinator 2.

A conduit 17 connects the conditioner with the chlorinator and may be provided with a valve 18. The latter might possible be omitted if the conditioner and chlorinator are disposed at the proper relative elevations, since a slight variation in the level of the charge in the conditioner would not seriously affect the operation and a slight rise in the level would merely result in a corresponding increase in the velocity of the discharge, thus automatically adjusting itself.

The chlorinator 2 comprises in its principal features a rubber-lined tank 19, preferably cylindrical in form, equipped with a central draft tube 20 and a series of vertical vanes 21 connecting the tube and the tank to counteract centrifugal action. The tank is closed on top and provided with a vent tube 22 having a cup-shaped upper end, with a rubber ball 23 lying in the cup to yield to inside pressure. The draft tube stops short of the upper and lower ends of the tank, as shown.

A central shaft 24 is mounted in the tank and carries an impeller 25 at its lower end and below the draft tube. The impeller comprises a disc 26 having upper and lower impeller blades 27 and 28 mounted thereon. A conical intake 29 immediately below the impeller is connected to the chlorine tank 30, through a conduit 31 having a flow meter 32 therein. The lower corner of the tank is cut off by a frusto-conical barrier 32', and a similar barrier 33 is provided near the upper end at the elevation of the launder 34 surrounding the upper end of the tank and communicating therewith through openings 35.

In operation, the upper blades of the impeller cause general circulation of the pulp which is drawn downwardly in the draft tube and rises outside the tube. The chlorine gas, which may be used approximately in the proportion of 1500 lbs. to a ton of concentrates, entering from the bottom, is thrown sidewise by the lower blades of the propeller and is thoroughly mixed into the agitated mass and partakes of the circulation. The chlorine reacts with the sulfides to drive off the sulfur and to form chlorides, the specific reactions being substantially as follows:

| | | |
|---|---|---|
| Gold | $2Au + 3Cl_2$ | $2AuCl_3$ |
| Silver | $Ag_2S + Cl_2$ | $2AgCl + S$ |
| Copper | $CuS + Cl_2$ | $CuCl_2 + S$ |
| Lead | $PbS + Cl_2$ | $PbCl_2 + S$ |
| Zinc | $ZnS + Cl_2$ | $ZnCl_2 + S$ |
| Iron | $2FeS + 3Cl_2$ | $FeCl_3 + S$ |

There may be variations in the metallic chlorides. Copper, for instance, may turn into $CuCl$, and iron into $FeCl_2$.

In the circulation process the level of the pulp in the draft tube 20 sinks below the level of the pulp outside the tube so that the pulp cascades down over the upper edge of the tube to form eddies which cause the free sulfur to liberate itself from the pulp and to rise to the top in the form of a froth which is forced outwardly by a conical disc impeller 36 for discharge into the launder 34.

In view of the fact that the pulp is largely water, the temperature in the chlorinator always remains cool and cannot rise beyond the boiling point of water. Comparatively little pressure develops in the tank, but if there is any excess pressure it may be vented through the tube 22 and the ball valve 23.

But is is desirable that the temperature in the chlorinator be kept considerably below the boiling point of water. As a matter of fact, it should be kept fairly close to outside air temperature. To bring about an additional cooling effect I provide the thickener 3 which serves at the same time as an outlet for the pregnant solution containing the metal chlorides in solution. The thickener is of conventional form and a portion of the pulp in the chlorinator is continuously by-passed through the same. It is equipped with cooling coils 37 and the pulp is made to enter through a pipe 38 connected to the chlorinator intermediate its height and equipped with a valve 39.

Clear or pregnant solution containing the metal chlorides is spilled over the upper edge of the thickener into the launder 40, while the solids are worked toward the bottom and discharged through the bottom outlet 41, from where they are returned to the bottom inlet 29 of the chlorinator and are forced back into circulation by the lower vanes of the impeller 25. A valve 43 controls the pipe 42, and a small outlet 44 may be provided to draw off a fractional portion of thickener under-flow to prevent the system from becoming clogged with insolubles.

The pregnant solution passes from the launder 40 through the filter 4, which may be of any suitable type adapted for clarifying the solution. The filter shown is a vacuum filter, vacuum being produced by the pump 46 in the pipe 47, which latter discharges the pregnant solution to the storage tank 5. This solution constitutes the final product of my chlorination process, and the metals and compounds contained therein may be readily recovered by progressive steps of selective precipitation which form no part of the present invention.

My invention was particularly developed in connection with the treatment of sulfide ores and one of the principal objects of my process is to liberate the sulfur present and to turn the sulfur into a marketable product. It should be observed, however, that my submerged chlorination process, as hereinabove described, is adapted for treatment of any metal bearing ore concentrates or pulverized ores. If no sulfur is present, the steps relating particularly to the recovery of sulfur will, of course, be omitted.

As stated before, the sulfur liberated in the chlorination process in the form of a froth is thrown out by the impeller 36 into the launder 34 and from there it is advanced to the sulfur separator 6 for further treatment. While the submerged chlorination process hereinabove described is a continuous process, the sulfur treatment is preferably carried on in a batch process, and in order to tie up the latter process with the chlorination process so as to avoid interruption, I arrange the sulfur treating apparatus in duplicates or multiples, with the discharge conduit 48 arranged so that its discharge end may be shifted from one unit to the other. Only one of the units is shown and described in the present application.

Tests made in the operation of my invention developed that under certain conditions there was a tendency for fine sulfide particles to collect with the sulfur in the froth and that a small amount of compressed air in a conical receptacle made a satisfactory separation of sulfur from the unfinished sulfides, leaving the sulfur in satisfactory condition for most sulfur solvents. Any other means of separating the froth from the sulfides would be satisfactory.

Thus, I provide in the first step of removing the sulfides the conical receptacle 6 into which the sulfur froth from the chlorinator is discharged. This receptacle has a bottom outlet 49 discharging into the pipe 50 controlled by a valve 51, the latter pipe leading back to the bottom of the chlorinator and having a compressed air inlet 52 at its free end for driving material descending from the conical receptacle 6 toward the chlorinator. Additional compressed air inlets are arranged near the bottom of the conical receptacle as at 53.

Under the influence of the compressed air the sulfur froth is raised to the top of the receptacle and the remaining sulfides sink toward the bottom for discharge into the pipe 50, by means of which they are returned into the chlorination circuit by the lower blades on the impeller 25.

The sulfur froth is skimmed from the top by a suitable continuous scraper 54 which delivers the froth upon an inclined trough 55 for delivery into the solvent agitator 7.

The agitator may be of any suitable type and its function is to dissolve the sulfur. Any suitable solvent may be used for this purpose but I found that caustic soda was most economical under normal temperature conditions and left the material in good condition for precipitation as atomic sulfur in the form of an extremely fine powder.

The solvent agitator discharges, through a pipe 56, controlled by a valve 57, into the sulfur precipitation tank 8, where a small amount of a precipitating agent, such as an aliphatic alcohol known in the market as B–23, is added, and where the sulfur settles out. From here the sulfur flows, through a valve-controlled pipe 58, into the filter 9 of conventional construction from which the sulfur may be removed in wheelbarrows, indicated at 59, while the solvent discharges into a pipe 60 from where it may be pumped, by the pump 61, to waste or to the precipitation tank 8 or to the solvent agitator 7, depending upon the condition of the solvent.

While in my chlorinator I use an agitator exerting downward draft on the draft tube, any other suitable agitating means may be used, such as hydraulic agitation as used in the Pachuca tank in which the circulation is reversed and the material is forced upward in the draft tube. But it is essential to produce eddies for froth accumulation and means for removing the froth as it accumulates.

While in the flow sheet the chlorine tank is shown as being arranged below the chlorinator, for convenience of illustration, in actual practice it should be mounted at an elevation higher than the chlorinator to prevent flow of the pulp toward the chlorine tank by gravity.

It should be noted that in this process the sulfur is taken out of the circuit as soon as it is liberated. This is important since otherwise the sulfur would eventually go into solution, as sulfuric acid and possibly some sulfur chloride, in which case the solutions would become too acid for satisfactory precipitation.

I claim:

1. A method of treating sulfide ore concentrates or the like which comprises the steps of mixing the concentrates with water to form an easy flowing pulp of substantially uniform density, agitating the pulp in a container in a circulatory path, introducing chlorine into the path whereby sulfur is liberated, breaking the flow of the pulp at a point along the surface thereof to produce eddies or whirlpools adapted for transforming the sulfur into froth and for continuously collecting said froth thereinto, and continuously withdrawing sulfur froth from said eddies or whirlpools.

2. A method of treating sulfide ore concentrates or the like which comprises the steps of mixing the concentrates with water to form an easy flowing pulp of substantially uniform density, agitating the pulp in a container in a circulatory path including upstream and downstream courses extending through the height of the body, introducing chlorine into the path whereby sulfur is liberated, breaking the flow of the pulp at the point of the discharge from the upstream course into the downstream course in the top region of the body to produce eddies or whirlpools at said point for transforming the sulfur into froth for continuously collecting said froth thereinto, and continuously withdrawing sulfur froth from said eddies or whirlpools.

3. A method of treating sulfide ore concentrates or the like which comprises the steps of, mixing the concentrates with water to form an easy flowing pulp of substantially uniform density, agitating the pulp in a container in a circulatory path including a central downstream course, and a surrounding cylindrical upstream course discharging into the downstream course in the top region of the body of the pulp, introducing chlorine into the path whereby sulfur is liberated, breaking the flow of the pulp at the point of discharge to produce eddies or whirlpools at said point for transforming the sulfur into froth and for continuously collecting said froth thereinto, and continuously withdrawing liberated sulfur froth from said eddies or whirlpools.

4. A method of treating sulfide ore concentrates or the like which comprises the steps of mixing the concentrates with water to form an easy flowing pulp of substantially uniform density, agitating the pulp in a container in a circulatory path including a central downstream course and a surrounding cylindrical upstream course discharging into the downstream course in the top region of the body of pulp, and through a restricted area, introducing chlorine into the path whereby sulfur is liberated, breaking the flow of pulp at the point of discharge to produce eddies or whirlpools at said point for transforming the sulfur into froth and for continuously collecting said froth thereinto, and continuously withdrawing liberated sulfur froth from said eddies or whirlpools.

References Cited in the file of this patent

UNITED STATES PATENTS

| Number | Name | Date |
|---|---|---|
| 412,300 | Selwyn | Oct. 8, 1889 |
| 748,461 | Armbruster | Dec. 29, 1903 |
| 843,986 | Baker et al. | Feb. 12, 1907 |
| 1,049,746 | Malm | Jan. 7, 1913 |
| 1,111,788 | Ewing | Sept. 29, 1914 |
| 1,402,318 | Rodebush | Jan. 3, 1922 |
| 1,435,142 | Angel | Nov. 14, 1922 |
| 1,865,979 | Tapie | July 5, 1932 |
| 1,898,701 | Westcott | Feb. 21, 1933 |
| 1,904,583 | Westcott | Apr. 18, 1933 |
| 2,017,330 | Traphagen | Oct. 15, 1935 |
| 2,299,188 | Stork et al. | Oct. 20, 1942 |
| 2,363,315 | Grothe | Nov. 21, 1944 |

FOREIGN PATENTS

| Number | Country | Date |
|---|---|---|
| 23,493 | Great Britain | of 1900 |